March 22, 1960     C. C. WEBB     2,929,421

MULTI-STATION TRANSFER TYPE MACHINE TOOL IMPROVEMENT

Filed March 27, 1958     4 Sheets-Sheet 1

INVENTOR.
CHARLES C WEBB
BY

March 22, 1960   C. C. WEBB   2,929,421
MULTI-STATION TRANSFER TYPE MACHINE TOOL IMPROVEMENT
Filed March 27, 1958   4 Sheets-Sheet 2

INVENTOR.
CHARLES C. WEBB
BY

INVENTOR.
CHARLES C. WEBB

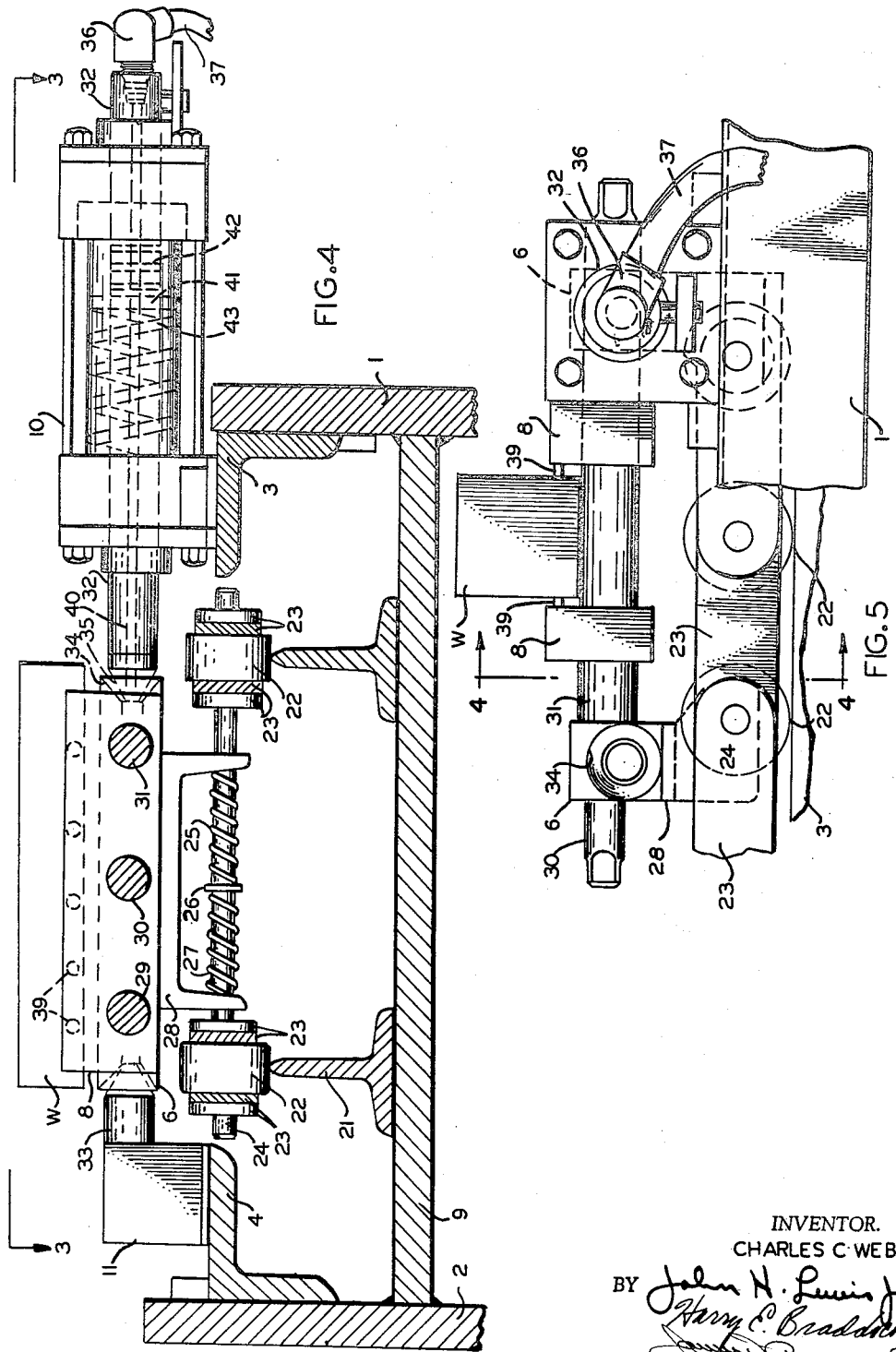
INVENTOR.
CHARLES C. WEBB

United States Patent Office 2,929,421
Patented Mar. 22, 1960

2,929,421

MULTI-STATION TRANSFER TYPE MACHINE TOOL IMPROVEMENT

Charles C. Webb, Wilmington, Del., assignor to Remington Arms Company, Inc., Bridgeport, Conn., a corporation of Delaware Application March 27, 1958, Serial No. 724,288

6 Claims. (Cl. 144—136)

This invention relates to multi-unit machine tools of the type in which workpieces, secured in suitable fixtures, arranged in a row are advanced step-by-step through a line of work stations in which the fixtures are held fast in predetermined positions while being machined. Usually such multi-unit machine tools are arranged for performing a plurality of different operations, such as drilling, reaming, boring and facing. While the present invention is believed to possess features of broad application, it is shown here as being particularly adapted for performing a series of operations on wood workpieces for use as fore-end stock pieces in the manufacture of firearms.

It is one object of this invention to provide an improved machine tool of the above character having novel means for supporting and accurately supporting the workpiece carrying fixtures so as to greatly simplify the construction of the machine and avoid the possibility of chips or the like interfering with the proper location of the fixtures carrying the workpieces.

It is another object of the present invention to provide an improved machine tool in which:

(a) A simple and economical transfer mechanism can be utilized.

(b) The necessity for precision, machined guide ways is avoided.

(c) The use of weldments, or welded frame units, for the transfer slide is permitted.

(d) There are no limits on the distance of transfer, and (e) It is possible to transfer the workpiece-carrying fixtures and lock the fixtures on and between standard existing machine tools.

Other objects and advantages of the invention will become apparent from the following detailed description taken in connection with the accompanying drawings, in which:

Figure 4 is an enlarged transverse sectional view through a workpiece carrying fixture taken on line 4—4 of Figure 5.

Figure 5 is an enlarged side view of the workpiece carrying fixture and supporting structure of Figure 3 taken along line 5—5.

In the embodiment of the invention herein shown by way of illustration, workpieces W, clamped in workpiece-carrying fixtures, are advanced with a step-by-step motion through a series of work stations each spaced from the other by a distance corresponding to the length of each stepping movement. The workpieces and fixtures are advanced preferably in a straight line and spaced along the path of travel are a plurality of individual tool units respectively designed to perform different operations upon workpieces in their travel through the machine.

Figure 1:
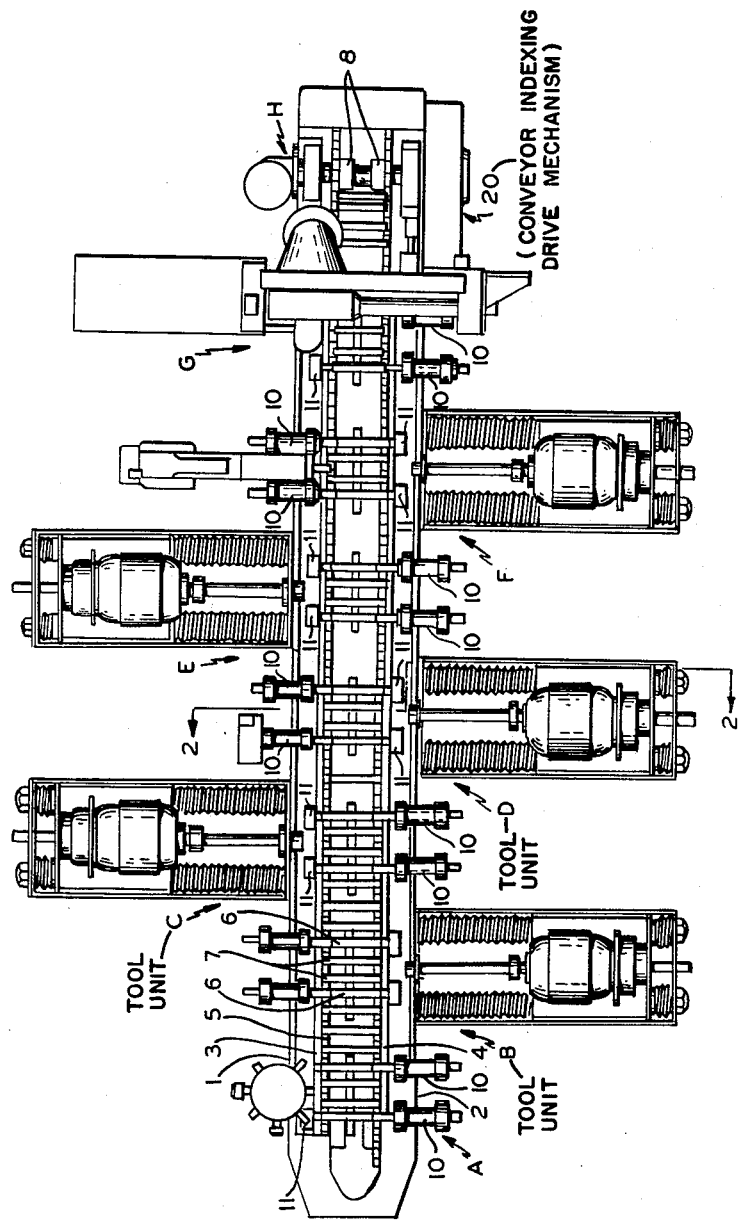
Figure 1 is a general plan view of a machine tool organization embodying the novel features of the present invention.

As shown in Figure 1, a plurality of tool units B, C, D, E, F and G are spaced along the path of travel of the workpieces and fixtures. Unit A is the station at which the workpieces are placed upon the workpiece-carrying fixtures and clamped in desired position against an adjustable stop device. Finished workpieces are also removed at this point. It will be understood that the individual machine units A, B, C, D, E, F and G form per se no part of the present invention. As herein shown they may be the way type, comprising (as in Figure 2) a tool as 60 driven by a motor 63 on a movable head which is advanced along a suitable way 64 toward and from either side of the workpieces in a direction perpendicular to the path of travel of the workpieces through the machine. Suitable power actuators such as, for example, hydraulic pistons and cylinders 69, are provided for advancing and retracting the tool heads. The individual tool units generally operate as the similar arrangements disclosed in U.S. Patents 2,108,207 and 2,108,779, all of the units being interlocked with the indexing mechanism and the workpiece-carrying fixture clamping mechanisms, so that the cycles of the different units cannot be initiated until the workpieces have been located and secured in proper positions adjacent the machine tool units which are to operate upon them.

Figure 2:
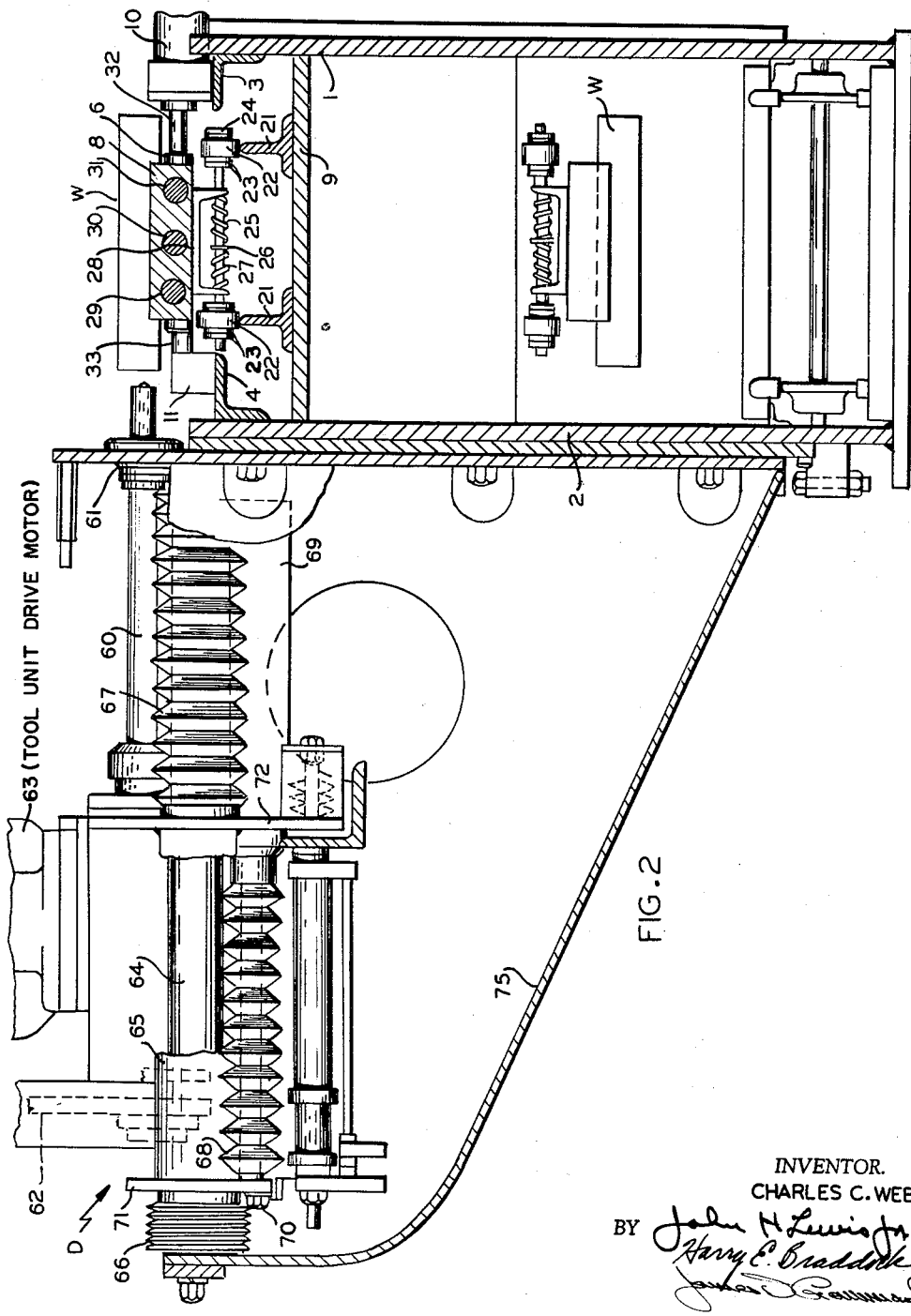
Figure 2 is a partial transverse vertical section through the machine taken on line 2—2 of Figure 1.

The main supporting frame of the machine of my invention consists of vertical side members 1 and 2 and a horizontal shelf member 9, best shown in Figure 2. Longitudinal horizontal guide members 3 and 4 are secured to frame members 1 and 2 respectively. Longitudinal guide rails 21 are secured on shelf member 9 in parallel relationship. The guide rails are provided with a cross-section similar to an inverted T, the upwardly projecting edge of which is formed in a knife-edge configuration to reduce the friction of roller elements supported thereon as later described. An endless roller conveyor consisting of two parallel interconnected chains made up of link elements 23, rollers 22, and connecting rods 24 is supported by engagement of the rollers 22 on the rails 21 and guided by members 3 and 4. The conveyor is passed over a sprocket wheel assembly at each end of the machine, one of which is illustrated at reference numeral 8 in Figure 1. Sprocket assembly 8 is driven in a step-by-step manner by a conventional indexing drive mechanism indicated at 20 in Figure 1. Workpiece clamping fixtures, hereafter termed workpiece carriers, are carried by the endless conveyor at spaced intervals along the carrier. The interval between the workpiece carriers generally corresponds to the space between the tool units and the distance through which the conveyor is moved by each step of the conveyor indexing drive.

Figure 3:
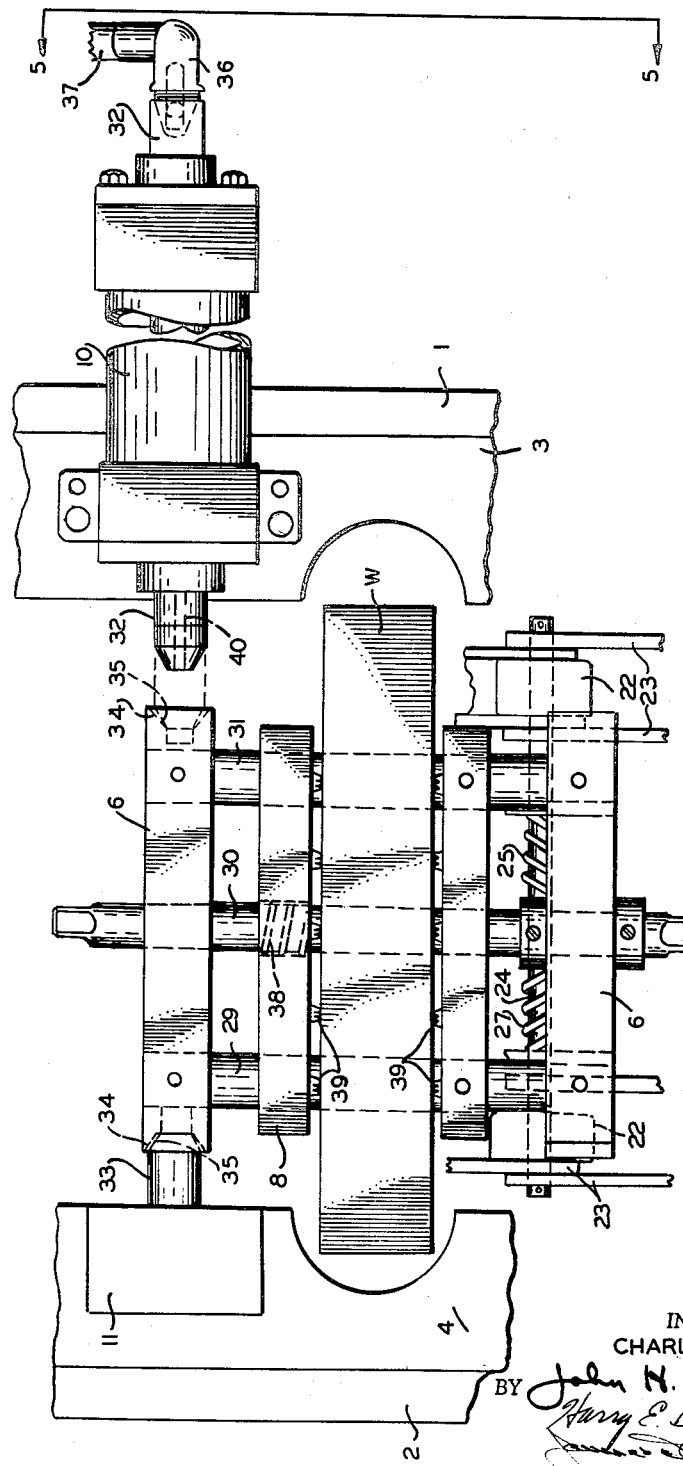
Figure 3 is an enlarged plan view of a workpiece carrying fixture in position on the machine, certain parts being broken away for a clearer showing of the parts.

Each workpiece carrier comprises two transverse frame members 6 (Figures 3 and 5) rigidly connected by rod elements 29 and 31. A fixed transverse clamp jaw 8 is rigidly attached to the rod elements 29 and 31 in opposed relation to another movable clamp jaw 8 which is slidably mounted upon rod elements 29 and 31. Movable clamp jaw 8 is actuated by shaft 30 which is slidably received in transverse members 6 and fixed clamp jaw 8. Shaft 30 is engaged with movable clamp jaw 8 by screw threads so that rotation of shaft 30 will move the clamp jaws relatively to secure or release a workpiece positioned therebetween. Relative longitudinal motion of shaft 30 is prevented by collar elements engaging one of the frame members 6. Grip elements 39 are provided on the workpiece engaging surfaces of the clamp jaws 8. A U-shaped bracket 28 is secured to the underside of each workpiece carrier transverse frame member 6. Each downwardly extending portion of the brackets 28 is slidably secured to a connecting rod 24 and thereby connected to the endless conveyor. A flange 26 is provided intermediate the ends of each connecting rod 24 and cooperates with two springs 25 and 27 acting between the flange and the downwardly extending portions of bracket 28 to resiliently center the workpiece carrier laterally on the endless conveyor. At each end of each transverse frame member 6 of each workpiece carrier is formed a conical socket 34.

Positioned on guide members 3 and 4 at each work position adjacent each tool unit is a set of fixed pins 33 accurately set in blocks 11 and an opposed set of movable pins 32.

The indexing drive in each step of its movement moves each workpiece carrier to a position in which the transverse frame members 6 are substantially aligned with the two sets of pins. Each pin is provided with a conical end configuration matching the conical sockets in the ends of transverse frame members 6 of the workpiece carriers. The movable pins upon being longitudinally extended by actuating cylinders 10 to engage the frame members 6, accurately position and secure the workpiece carrier at each work position against the fixed pins 33 and positively support the carrier together with the workpiece to be engaged by the machine tool unit at that station.

The movable pins 32 are pistons slidably mounted in air cylinders 10, best illustrated in Figure 4; pin or piston elements 32 are provided with a flange 41 or enlarged portion at a central portion along its length which closely fits the interior of cylinder 10. Acting on one side of the flange 41 is a compression spring 43 which urges the piston 32 toward the disengaged position with respect to frame member 6 of the workpiece carrier. The piston 32 is provided with an axial passage 40 which communicates with the interior of the cylinder 10 by means of radial ports 42. This permits the air pressure admitted through flexible conduit 37 and fitting 36 by control means not shown to force the piston 32 against the force of spring 43 into engagement with the frame member 6 of the workpiece carrier. A restriction is provided in axial passage 40 between the ports 42 and the opening at the extremity of piston 32. As will appear from the drawings, air will escape under pressure from the end of piston 32 as it approaches the socket in member 6 and being directed into the socket will clean out any chips or other matter lodged therein to insure a tight and accurate fit. When the end of piston 32 is firmly engaged in the socket 34 the flow of air from the end thereof is blocked off and the workpiece carrier is firmly held in position by air pressure during the work performed on the workpiece at that given work station.

Due to the alternating positions of the movable pin or piston sets, each pair of sockets 34 will be cleaned once for every two work stations passed. It will be clear from the drawings that the limited lateral movement of bracket 28 on the connector rods 24 against the force of springs 27 and 25 will permit the positioning of the workpiece carrier against the fixed pins by the movable pins at each work station and also allow the workpiece carrier to be centered in the longitudinal path of movement upon retraction of the movable pins to permit passage to the next station.

The endless conveyor passes beneath the shelf member 9 to return the finished workpieces to the loading and unloading station indicated at A as shown in Figure 2.

Having discussed the structure and arrangement of parts of the machine of the present invention, the sequence of operation will now be described, taking a single workpiece through the machine for the purposes of making the functioning of the mechanism clear.

With the endless conveyor at rest, a workpiece is positioned properly upon the workpiece carrier at position A and firmly secured in position between clamping jaws 8 by rotation of shaft 30 by suitable means such as a power wrench. The machine controls are actuated to cause the indexing drive mechanism 20 to drive the conveyor and workpiece carrier through one step of movement.

This movement of the conveyor brings the workpiece on its carrier substantially in proper alignment at position B before the first machine tool unit. Final alignment and securing in operative position at position B is accomplished by the extension of movable pins 32 which rigidly clamp the transverse frame members 6 of the workpiece carriers between fixed pins 33 and movable pins 32. The matching conical portions of the pins and sockets in members 6 insure accurate alignment of the workpiece with the working element of the machine tool unit at that station. Extension of the movable pins 32 is controlled by simultaneous application and maintaining of air pressure in the cylinder supply lines by a master valve means not shown. When the workpiece carriers are thus aligned and held in position the interlocks permit the operation of the machine tool units upon the workpiece at each station. When the desired operation is completed at each station, the air pressure to cylinders 10 is released, allowing the springs 43 to withdraw pins 32 and the springs 27 to center the carriers. The indexing drive is then caused to move all the carriers onto the conveyor or to the next station where the cycle is repeated.

Examples of typical operations on a firearm fore stock are:

(1) At B, bore from first end at one diameter.
(2) At C, bore from second end at a different diameter.
(3) At D, ream first end bore.
(4) At E, ream second end bore.
(5) At F, enlarge mouth of first end bore to form annular space.
(6) At G, press fit a bearing bushing into annular space in first end bore.

The workpieces on the carriers then pass around sprocket 8, back across the under side of the machine to the unloading and loading station A.

It will be understood that while I have disclosed my invention as incorporated in a particular form of multi-unit machine tool, the underlying principles thereof may be utilized in other types of machine tools, and that considerable variation in the form and construction of the parts may be made, as will be apparent to those skilled in the art, without departing from these underlying principles.

I therefore desire by the following claims to include within the scope of my invention all such similar or equivalent constructions wherein substantially the results of my invention may be obtained in substantially the same way.

I claim:

1. A machine tool comprising a plurality of tool units each at one of a plurality of work stations at which machining operations are to be performed upon workpieces, a conveyor means for moving a plurality of workpiece carriers from station to station in a step-by-step manner, means movably securing said workpiece carriers to said conveyor means at given spaced intervals thereon, means for securing a workpiece to each carrier, means supporting and guiding said conveyor means in its step-by-step movement between work stations, means at each work station cooperating with each carrier to independently accurately position and support each said carrier relative to said work station during the machining operation, and means for automatically clearing chips and debris from said means for accurately positioning and supporting said carriers.

2. A multi-unit machine tool having a plurality of work stations at which machining operations are to be performed upon workpieces and comprising a supporting frame structure, a conveyor means movably mounted on said frame structure, a step-by-step indexing drive mechanism connected to said conveyor means guiding and supporting means in said frame structure cooperating with said conveyor means, a plurality of workpiece carrier assemblies movably mounted on said conveyor means at spaced intervals thereon, each carrier assembly having a clamping device for securing a workpiece thereto, means at each work station cooperating with said carrier assemblies to simultaneously accurately align and support said workpieces in operative position in said frame structure independently of said guiding and supporting means for said conveyor during the machining operations, said means for aligning and supporting said workpieces in operative position during the machining operation comprising releasable tapered pin and tapered socket connections between said frame structure and said carrier assemblies, said connections provided with air jet means for automatically clearing away chips and debris from said connections to insure proper alignment of said workpieces at the work stations.

3. A multi-unit machine tool having a plurality of work stations at which machining operations are to be performed upon workpieces, a frame, an endless conveyor means mounted on said frame, a step-by-step indexing drive mechanism drivingly connected to said conveyor means, guiding and supporting ways for said conveyor means, a plurality of workpiece clamping assemblies movably secured to said conveyor at spaced positions thereon, each assembly provided with two opposed sets of tapered sockets thereon, a clamping assembly aligning and supporting means positioned at each work station to accurately maintain the position of each clamping assembly and the conveyor during the machining operation, said aligning and supporting means comprising two opposed sets of taper pins mounted for relative movement between first and second positions in said frame adjacent each work station, said sets of taper pins constructed and arranged to engage with said sets of sockets in each said carrier in said first position and remain disengaged therefrom in said second position, pin actuating means for moving said taper pins between said first and second positions, and air jet means for clearing ships and debris from said sockets upon operation of said pin actuating means.

4. A multi-unit machine tool having a plurality of work stations at which machining operations are to be performed upon workpieces, said tool comprising a frame, an endless conveyor mounted on said frame, guideways in said frame cooperating with said conveyor, a step-by-step indexing drive mechanism in said frame connected with said conveyor, a plurality of workpiece carriers movably secured to said conveyor at regular intervals thereon, means for securing a workpiece to each carrier, each carrier provided with a first and second set of opposed tapered sockets thereon and a clamping means for securing a workpiece in operative position, a first set of fixed taper pins mounted in said frame adjacent each work station and positioned in opposed relation to a second set of movable taper pins in said frame, said first and second sets of taper pins so constructed and arranged to interengage with said sets of tapered sockets in said carriers to accurately align and rigidly support each said carrier and the conveyor independently in said frame during machining operations at each work station, each movable taper pin provided with an orifice to direct a jet of air into its socket to remove chips and debris therefrom.

5. In a multi-unit machine tool having a plurality of work stations at which machining operations are to be performed upon workpieces, the combination of a plurality of workpiece carriers provided with means for securing a workpiece thereto, a conveyor means for moving said carriers from work station to work station in a step-by-step manner, guide means for said conveyor means and a means at each work station independent of said guide means and conveyor means, cooperating with each carrier to simultaneously both accurately position and rigidly support the same with respect to the work station during the machining operation.

6. In a multi-unit machine tool having a plurality of work stations at which machining operations are to be performed upon workpieces, the combination of a plurality of workpiece carriers each provided with means for securing a workpiece thereto, a conveyor means for moving said carriers between the work stations in a step-by-step manner, means connecting said carriers to said conveyor, guide means for said conveyor and a means at each work station cooperating with each carrier to simultaneously accurately position and rigidly support each carrier and the conveyor means, independently of said guide means, with respect to the work station during the machining operation.

References Cited in the file of this patent

UNITED STATES PATENTS

| | | |
|---|---|---|
| 816,030 | Neville | Mar. 27, 1906 |
| 1,182,733 | Aycock | May 9, 1916 |
| 1,511,486 | Westberg et al. | Oct. 14, 1924 |
| 1,653,932 | Shaw | Dec. 27, 1927 |
| 1,696,502 | Peterson | Dec. 25, 1928 |
| 1,985,302 | Tretbar | Dec. 25, 1934 |